Figure 1:
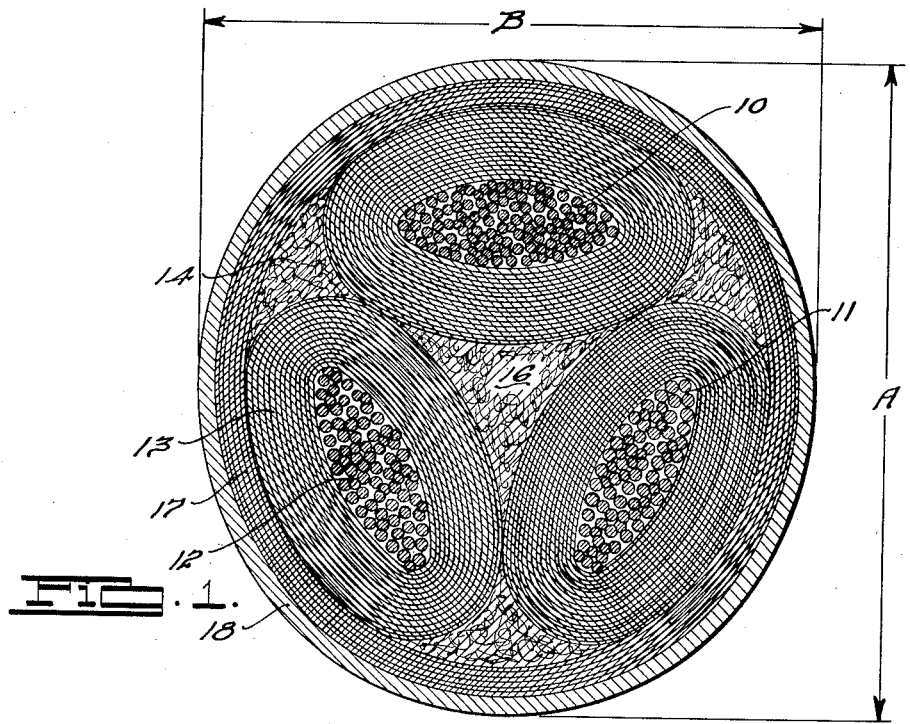

Jan. 7, 1941.　　　L. I. KOMIVES　　　2,227,503

ELECTRIC CABLE

Filed Dec. 10, 1937

INVENTOR
Laszlo I. Komives.
BY
ATTORNEY

Patented Jan. 7, 1941

2,227,503

UNITED STATES PATENT OFFICE 2,227,503

ELECTRIC CABLE

Laszlo I. Komives, Detroit, Mich., assignor to The Detroit Edison Company, a corporation of New York Application December 10, 1937, Serial No. 179,091

1 Claim. (Cl. 174—26)

This invention relates to conductors and more particularly to electric cables of the multiple-conductor sheathed type.

Cables of this nature generally comprise three conductors, each conductor being made up of multiple strands wrapped spirally with many layers of insulating material. The three conductors, together with their insulation, may be partially deformed so that they each have a noncircular cross-section in order to reduce the overall diameter of the assembled cable. Filler strips may be placed in any remaining gaps between the assembled conductors, and the entire assembly may be further wrapped in a belt of additional layers of insulating material such as paper tape, or of insulating material and conducting material as may be desired. The assembly is then encased in a lead sheath. At any suitable stage in the manufacture of the cable the fibrous material and, in fact, the entire body of the cable, may be filled with a liquid dielectric such as oil.

In the operation of a cable of this nature the conductors become heated and the dielectric expands. This creates an internal pressure within the lead sheath, a pressure which is generally uniformly distributed throughout the material of the sheath. Despite the most accurate manufacturing procedures, the sheath is not possessed of uniform thickness and is sometimes weak due to the presence of oxides and other inferior materials. These may occur at any point and, due to the uniformity of the internal stresses, the weakest points immediately start to stretch and eventually the cable will fail.

If, however, it were possible to concentrate the stresses into a particular portion of the circumference of the sheath, the chances of a cable failure would be reduced, especially if this can be accomplished without changing the distribution of the non-uniformities of the lead. This is what I propose to accomplish.

Any hollow vessel, such as the lead sheath of the present case, when subjected to an internal pressure tends to assume a circular cross-section. This is accomplished by an outward bending of those portions of the vessel's wall which possess the greater radii of curvature. Thus, in a non-circular lead sheath, the first stresses, induced internally, are bending stresses confined to those portions of the cable wall which have the greater radii of curvature, and the rest of the wall, which according to the law of averages will also contain thin spots and impurities, will not be stressed and hence the chance of failure at these points will be reduced and the cable life will tend to be improved.

The above principle, when applied to my problem, leads to a cable core (conductors and all insulation) which has an oval or elliptical cross-section and a closely fitting sheath. Then, as the sheath is warmed up, the parts of the sheath having the larger radii of curvature, that is the sides of the oval, will bear the brunt of the deformation over nearly the whole lengths of the sides. Consequently the deformation per unit of length around the sheath perimeter will be less along the sides and the ends of the oval will be substantially free from deformation.

If it is desired to further strengthen the oval sides of the sheath, this may be done by increasing their thickness, as by adding the material to the outside of the sheath. When this is done the process may be carried on until the outside of the sheath is circular, the inner contour remaining oval. This construction is not essential but may, under certain conditions, prove useful.

One of the objects of my invention therefore is to provide a multiple conductor sheathed cable in which the sheath stresses are non-uniformly distributed.

Another object of my invention is to provide a sheath for a multiple conductor cable in which sheath irregularities do not have the same distribution around the cable as do the stresses induced in the sheath.

Yet another object of my invention is to provide an arrangement of cable conductors and their insulation into an oval cross-section and to sheath such a cable in a material of uniform thickness.

A further object of my invention is to provide a cable sheath having an oval inner contour and a circular exterior.

Figure 2:
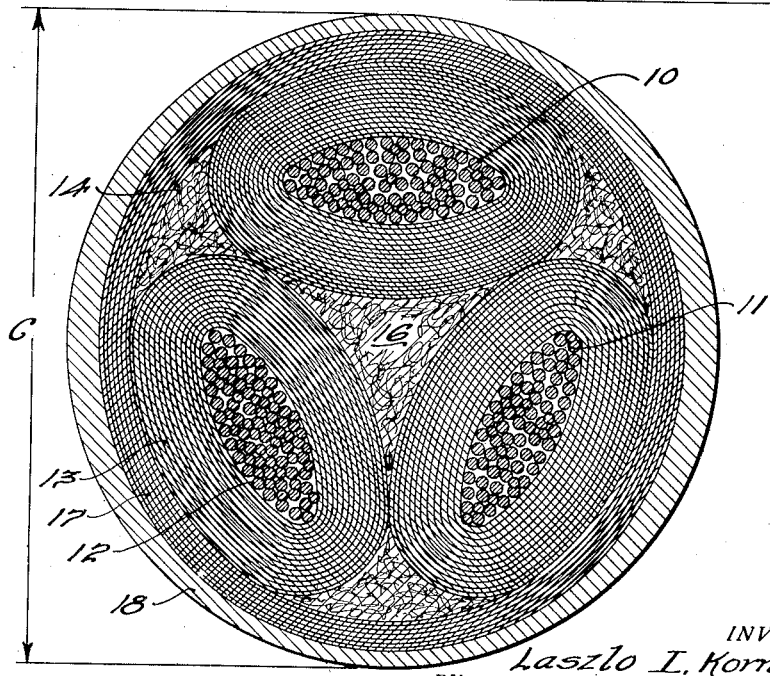

Other objects of this invention will more fully appear from the following detailed description taken in connection with the accompanying drawing which illustrates the preferred embodiment thereof, and in which Fig. 1 is a section through a multiple conductor cable incorporating my invention, and Fig. 2 is a similar section through a modified cable construction.

Referring to the drawing, 10, 11, and 12 illustrate stranded sector-shaped cable conductors having layers of fibrous insulating material 13 wrapped around the individual conductors. The regions between the conductors may be filled with additional insulating material such as the filler strips 14, and 16.

This assembly may be further wrapped in a belt 17 of fibrous insulating material when a cable of the so-called "belted" type is desired.

The conductors and their insulating material are arranged in such a manner as to present an oval cross-section, with the major axis A of the oval passing through substantially the mid-point of the conductor 10, coincidental with the minor axis thereof, and substantially midway between the conductors 11 and 12.

The dimension B thus represents the minor axis.

One method of producing an oval assembly of conductors and insulation is to modify the present machinery by employing a revolving oval die at the cabling machine, where the three conductors are assembled.

Around this assembly is placed a sheath 18 of a material such as lead.

In a specific example, a cable having a diameter, when circular, of about 2½ inches, will in the present case have a major axis $\tfrac{1}{8}$ of an inch greater than this amount and a minor axis about $\tfrac{1}{8}$ of an inch less.

In the manufacturing of cable the insulation and the conductors are passed through a die, softened lead being applied at this point and cooled to provide a sheath. One example of how my invention could be applied to the manufacture of cable is to modify the construction of the machinery so that the die will have an oval section and will rotate to follow the lay of the conductors.

The modification of my invention shown in Fig. 2 may be accomplished without rotating the die and is one in which the outside of the sheath is substantially circular, the inside of the sheath being oval with the major axis of the oval lying in a direction parallel to the dimension arrow C.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

I claim:

A cable having three multiple strand conductors, each with individual insulation, the cross section of each conductor and its insulation being generally elliptical, the three conductors and their insulation being enclosed in a lead sheath throughout the perimeter of said cable, the cross section of the complete cable being also generally elliptical with the major axis coincidental with the minor axis of one of the elliptical conductors and its insulation and passing substantially midway between the other two conductors.

LASZLO I. KOMIVES.